Aug. 26, 1969

W. S. KILLEN 3,463,508

BACKGUARD FOR TRACTOR

Filed Aug. 8, 1967

William S. Killen,
INVENTOR.

BY

*C. A. Phillips*
ATTORNEY.

United States Patent Office 3,463,508
Patented Aug. 26, 1969

3,463,508
BACKGUARD FOR TRACTOR
William S. Killen, P.O. Box 29, Athens, Ala. 35611
Filed Aug. 8, 1967, Ser. No. 659,058
Int. Cl. B60r *21/02*
U.S. Cl. 280—152
3 Claims

ABSTRACT OF THE DISCLOSURE

A backguard protector for operator of tractor equipped rotary cutter wherein the backguard consists of a sheet of fairly thin gauge metal supported by two spaced vertical upright members mounted on the differential housing of the tractor to provide a protective barrier for the operator from objects which tend to be thrown out by the rotary cutter.

---

This invention relates to safety devices for tractor operators and particularly where the tractor is equipped with rotary cutters for use in cutting grass, brush and small trees.

One of the most widely used tractor implements today is the rotary cutter which is used not only in agricultural work but in land clearing in general. A widely observer use is by highway departments which use tractor equipped rotary cutters for keeping brush cut along road right-of-ways.

Rotary cutters of the type with which we are concerned are similar to the cutting portion of a rotary lawn mower but are, of course, larger. Tractor type rotary cutters are connected to the rear of the tractor and are usually mounted to be adjustable in angle and cutting height by means of a universal type three-point hitch widely used on tractors for mounting all types of tractor implements.

The rotary cutter blades are driven by power take off from the tractor and the speed of the blades is a function of the transmission speed of the tractor. However, even at fairly low speeds where the tractor is literally operating at idling speed the peripheral speeds of the cutter blades are fairly high due to the length of the blades which typically are four to eight feet in length. As a result, when a blade strikes a foreign object, very frequently a rock, the rock is propelled away at extremely high speeds. While normally the position of the tractor operator is such that he is not in a direct line of travel of the initial flight of the rock, very often the rock will strike some portion of the cutter frame or tractor body and be deflected onto the operator. Because of the frequency of such occurrences rotary cutter operation is regarded as fairly hazardous and few operators have escaped at least minor injuries.

Accordingly, it is the object of the present invention to provide a backguard, or backsaver, as the device is frequently called, for tractors, which will substantially eliminate the dangers now normally incident to tractor driven rotary cutter operations.

In accordance with the invention a personnel backguard is adapted to mount to the rear of the tractor between the tractor and rotary cutter. The backguard employs a sheet of fairly thin and flexible steel material which is supported by two upright members spaced apart but near the center of the backguard and spaced substantially from the outer vertical edges of the backguard. In this manner there is formed three sectors, one being the sector between the upright supporting members and the others being two sectors outboard of the supporting members. It has been found that with this configuration the outer sectors are left fairly flexible and they are the ones which take most of the thrown debris. Being flexible the outer sectors give significantly with the thrown object permitting it to be deflected safely to the side of the operator instead of puncturing the backguard. The upright members are in turn supported by a mounting plate which is adapted to mount on the differential housing of the tractor employing the bolts already in the housing.

These and other objects, features and advantages of the invention will become more apparent from the following description when considered together with the drawings in which.

Figure 1:
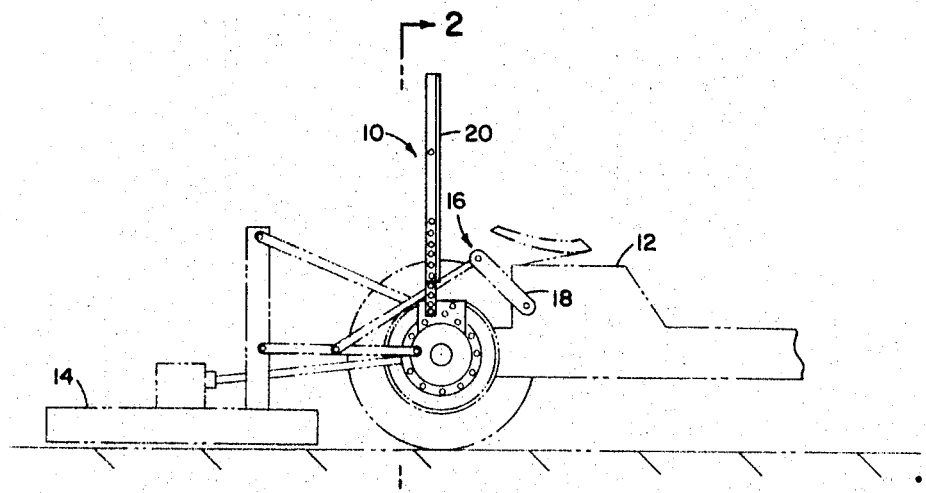
FIG. 1 is a side elevation view of a rotary cutter equipped tractor employing the invention.
Figure 3:
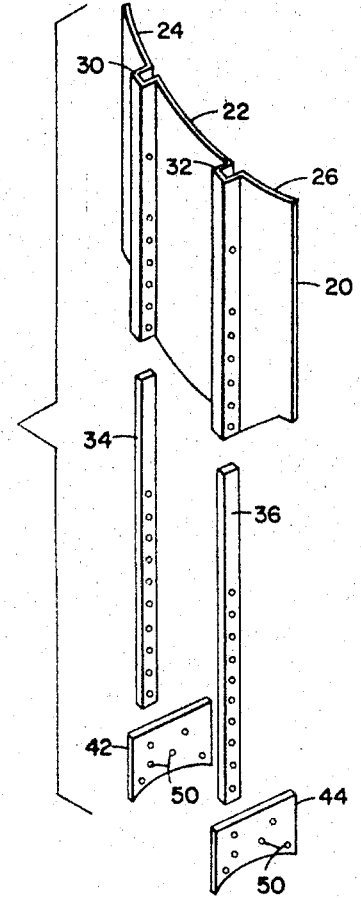
FIG. 3 is an exploded perspective view of an embodiment of the invention.
Figure 2:
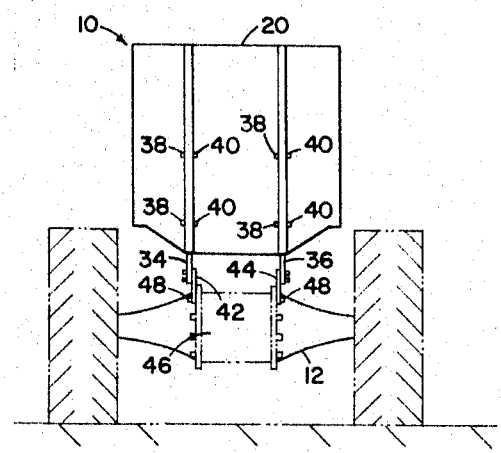
FIG. 2 is a back elevation view of a tractor employing the invention.

Referring now to the drawings, a backguard assembly 10 is mounted on the rear of tractor 12 between tractor 12 and rotary cutter 14 which is attached to tractor 12 by means of a conventional three-point hitch assembly 16 which provides height adjustment and control of the cutter through hydraulically actuated arms 18 mounted on tractor 12.

Backguard assembly 10 which protects a tractor operator from debris thrown by rotary cutter 14 employs a basic barrier member 20 of thin sheet steel of approximately eighteen to twenty-two gauge and consists of an inner sector 22 and outer sectors 24 and 26, which outer sectors 24 and 26 are turned forward about ten degrees with respect to inner or center sector 20. The outer sectors receive most of the thrown objects as the flight paths normally include striking a side wall of the rotary cutter from which an object glances onto one of the outer sectors. By providing the angular departure, as described, for outer sectors 24 and 26 the tendency of deflecting the objects to the side is increased. As a further factor providing increased protection for the operator, the outer sectors are relatively free to pivot, or bend, when struck, about U-shaped regions 30 and 32 separating the inner and outer sectors, which form a natural pivot or bending line of departure. This not only tends to absorb the force of the blow but also increases the tendency of deflection due to the increased angle at the pivot.

Upright supporting arms 34 and 36 are positioned, respectively, in U-shaped regions 30 and 32 of barrier 20 wherein they are fastened to barrier 20 by bolts 38 and fastening nuts 40.

The bottom portions of arms 34 and 36 are attached by bolts to mounting plates 42 and 44, which in turn, are bolted to opposite sides of differential housing 46 of tractor 12 by mounting bolts 48 through two or more of universal mounting holes 50.

In operation, and with the blade (not shown) of rotary cutter 14 turning, rocks, sticks, and other debris caught by the blade is propelled away at high speeds with a significant amount of it being thrown in the direction of the operator. When this occurs, barrier member 20 receives the blow rather than the operator and it is constructed and positioned to cause objects to be deflected to the side or above the operator.

While a specific embodiment of a tractor safety device for the protection of a tractor operator from debris thrown from the rear of the tractor has been disclosed in the foregoing description, it will be understood that various modifications within the spirit of the invention may occur to those skilled in the art. Therefore, it is intended that no limitations be placed on the invention except as defined by the scope of the appended claims.

What is claimed is:

1. A backguard for the protection of the operator of a tractor, said backguard being adapted to be positioned behind the seat of and between the rear wheels of the tractor and comprising:
   (A) a sheet of solid thin gauge metal of a width to cover a substantial portion of the width of a tractor between rear tractor wheels and of a height substantially the same as the width;
   (B) first and second supporting straps attached to said sheet, said straps being vertically positioned and spaced to divide said sheet into three substantially equal size sectors and to provide pivot means for permitting the outer sectors of said sheet to bend forward upon being struck by an object;
   (C) a mounting plate having a concave lower edge conforming to the differential housing of said tractor and supporting said first supporting strap and including mounting means for mounting said mounting plate to one side of the differential housing of said tractor; and
   (D) a second said mounting plate supporting said second supporting strap and including mounting means for connecting said mounting plate to the opposite side of the differential housing of the tractor.

2. The backguard for a tractor set forth in claim 1 wherein said sheet has first and second U-shaped regions running vertically and said first supporting strap is positioned in a cavity made by said first U-shaped region and said second supporting strap is positioned in the cavity formed by said second U-shaped region, said cavity forming with said supporting strap said pivot means.

3. The backguard set forth in claim 2 wherein the outer of said sectors of said sheet are turned to slightly face each other.

References Cited

UNITED STATES PATENTS

| | | | |
|---|---|---|---|
| 925,141 | 6/1909 | Smith | 280—159 |
| 3,210,089 | 10/1965 | Hoffman et al. | 280—43 |
| 3,244,251 | 4/1966 | Duncan | 296—102 |

BENJAMIN HERSH, Primary Examiner

JOEL E. SIEGEL, Assistant Examiner